United States Patent [19]

Luther

[11] Patent Number: 5,136,820
[45] Date of Patent: Aug. 11, 1992

[54] POLISHING METHOD

[75] Inventor: James P. Luther, Hickory, N.C.

[73] Assignee: Siecor Corporation, Hickory, N.C.

[21] Appl. No.: 706,882

[22] Filed: May 30, 1991

[51] Int. Cl.⁵ .................................................. B24B 1/00
[52] U.S. Cl. .................................. 51/283 R; 51/317; 51/328
[58] Field of Search .................. 51/283 R, 317, 318, 51/328

[56]  References Cited

U.S. PATENT DOCUMENTS

| | | | |
|---|---|---|---|
| 3,715,842 | 2/1973 | Tredinnick | 51/281 |
| 4,272,926 | 6/1981 | Tamulevich | 51/216 R |
| 4,492,060 | 1/1985 | Clark | 51/283 R |
| 4,831,784 | 5/1989 | Takahashi | 51/131.1 |
| 4,905,415 | 3/1990 | Moulin | 51/217 S |
| 5,007,209 | 4/1991 | Saito | 51/283 R |

OTHER PUBLICATIONS

Buehler Ltd. 1987 Catalog p. 29.
Seiko Instruments Instruction Manual to High-Speed PC Polisher OFL-760-A.
"An Automatic Processing Machine for Optical-Fiber Connectors," Proceedings of the 6th International Conference on Production Engineering, Osaka, 1987, pp. 563-568.

Primary Examiner—Bruce M. Kisliuk
Assistant Examiner—Jack Lavinder
Attorney, Agent, or Firm—J. David Abernethy

[57]  ABSTRACT

A method for polishing optical connectors provides for polishing a connector ferrule on a napless nylon cloth having a four shaft satin weave, 70 denier, 90×120 count. An aqueous slurry of silicon dioxide particles is used when polishing takes place.

8 Claims, 1 Drawing Sheet

POLISHING METHOD

BACKGROUND OF THE INVENTION

The invention is in the field of polishing optical connectors, particularly light waveguides housed in tubular ferrules.

Optical fiber connectors are essential to an optical fiber network. Any link loss budget for a network must consider anticipated losses at each junction between optical fibers.

Typically, light transmissions are propagated from one light waveguide through another by an end to end surface mating of two light waveguides. Very often, such end to end matings are facilitated by the use of tubular ferrules, such as ceramic ferrules, housing light waveguides therewithin. Various commercial connectors house these ferrules and bring ferrules into end to end relationship with each other. Misalignment of the ferrules increases signal loss to the system.

An issue which must be addressed in such connections is how to handle the distance between two ferrules in a connection. Damage can occur to the light waveguide interfaces if they are forced together too roughly. Another problem is transmission loss due to a gap between the ferrules. Such gaps cause problems not only due to light impulses escaping through the gap, but also due to the fact that the gap between the end faces being of a different type (such as air) than the medium within the light waveguides, such as glass.

Even if the ferrule end faces are perfectly aligned, the above "gap" problems can persist if end face polishing of the ferrules results in an undercutting of the light waveguide, or optical fiber, with respect to the ferrule end face. Since undercutting causes a small air gap to be maintained between the light waveguides even in the presence of a perfect ferrule fitting, end face polishing methods must consider this problem. Ferrule end faces may be polished either by hand or by polishing machines which have been on the market for several years. In either case, a liquid polishing agent containing particles is typically used on a polishing surface against which the ferrule and light waveguide end face is polished. It is known to use either diamond or silicon dioxide particles in these polishing agents. The use of diamond particles changes the surface index of refraction of the light waveguide end face, resulting in higher reflection values. The use of softer material such as silicon performs better in this respect, but typically the glass light waveguide end face in preference to the ferrule surface, causing the "undercutting" problems referred to above.

A connector can press a flexible polishing surface to form a cup shape which polishes away the edge of a ferrule, but the use of a flexible surface alone does not solve the undercutting problems.

Therefore, a need exists for a polishing process which can be used with modern machinery and allows the use of the softer silicon dioxide particles but which does not result in glass undercutting.

SUMMARY OF THE INVENTION

The improved method of the current invention, best practiced on modern polishing equipment, results in a protruding light waveguide end surface in polishing a light waveguide mounted in a ceramic ferrule. A woven nylon cloth is used as the polishing surface in conjunction with an aqueous slurry of silicon dioxide particles. A polishing pressure of 30 to 60 pounds per square inch is desirable.

BRIEF DESCRIPTION OF THE DRAWINGS

The preferred polishing method is described with aid of the drawings, in which.

DETAILED DESCRIPTION OF THE PREFERRED EMBODIMENT

Figure 1:
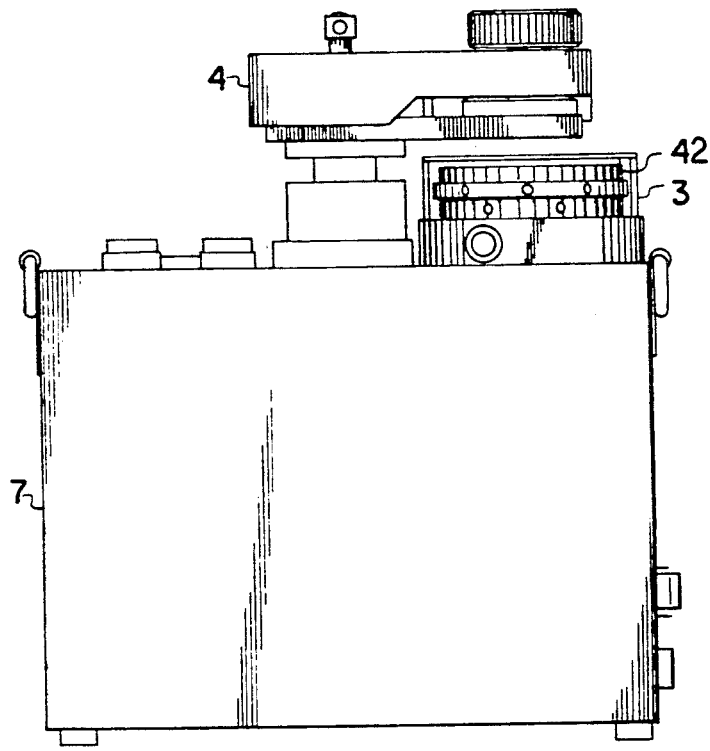
FIG. 1 is a diagrammatic elevation of a polishing machine which can be used to practice the invention; and, FIG. 2 is a diagrammatic elevation of the polishing surface during practice of the invention.

Shown in FIG. 1 is polishing machine 7, which may by example be the machine described in U.S. Pat. No. 4,831,784. Machine 7 has rotatable arm 4 which holds the ferrule over polishing wheel 42. Wheel cover 3 protects wheel 42.

Figure 2:
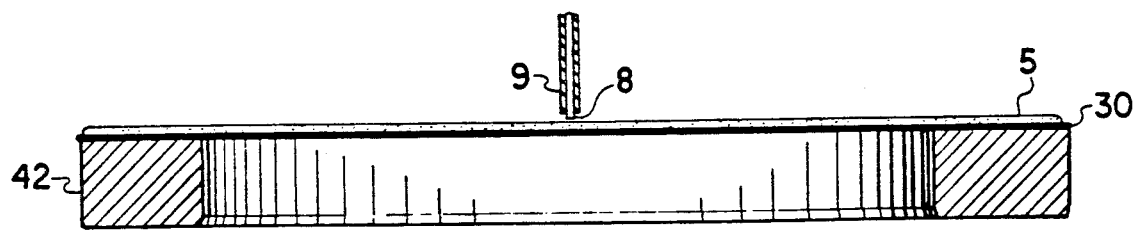

A more detailed view of actual polishing is shown in FIG. 2. Woven nylon cloth 30 is affixed to wheel 42. Cloth 30 is a four shaft satin weave, 70 denier, 9×120 count, napless cloth. An aqueous slurry of silicon dioxide particles 5 is applied to cloth 30. The silicon dioxide particles have an average diameter not exceeding 0.014 micrometers. Depending from arm 4 is metal holder 9, holding element 8, which is a light waveguide mounted in a ceramic ferrule. Machine 7 is set to apply a downward pressure on metal holder 9 of 30 to 60 pounds per square inch. Element 8 is polished until the desired finish is achieved.

What is claimed is:

1. A method for polishing an optical connector comprising an optical waveguide housed in a ceramic ferrule comprises polishing the optical waveguide housed in a ceramic ferrule on a woven nylon cloth using an aqueous slurry of silicon dioxide particles wherein the ceramic ferrule is removed at a rate faster than the optical waveguide removal rate, so that the waveguide protrudes from the ferrule upon completion of the polishing.

2. The method of claim 1 using an aqueous slurry of silicon dioxide particles having an average diameter not exceeding 0.014 micrometers.

3. The method of claim 2 wherein the optical connector is polished using a pressure of thirty to sixty pounds per square inch.

4. The method of claim 1 wherein the nylon cloth is a four shaft satin weave, 70 denier, 90×120 count, napless cloth.

5. The method of claim 4 wherein the optical connector is polished using a pressure of thirty to sixty pounds per square inch.

6. The method of claim 4 using an aqueous slurry of silicon dioxide particles having an average diameter not exceeding 0.014 micrometers.

7. The method of claim 6, wherein the optical connector is polished using a pressure of thirty to sixty pounds per square inch.

8. The method of claim 1 wherein the optical connector is polished using a pressure of thirty to sixty pounds per square inch.

* * * * *